Patented Dec. 25, 1928.

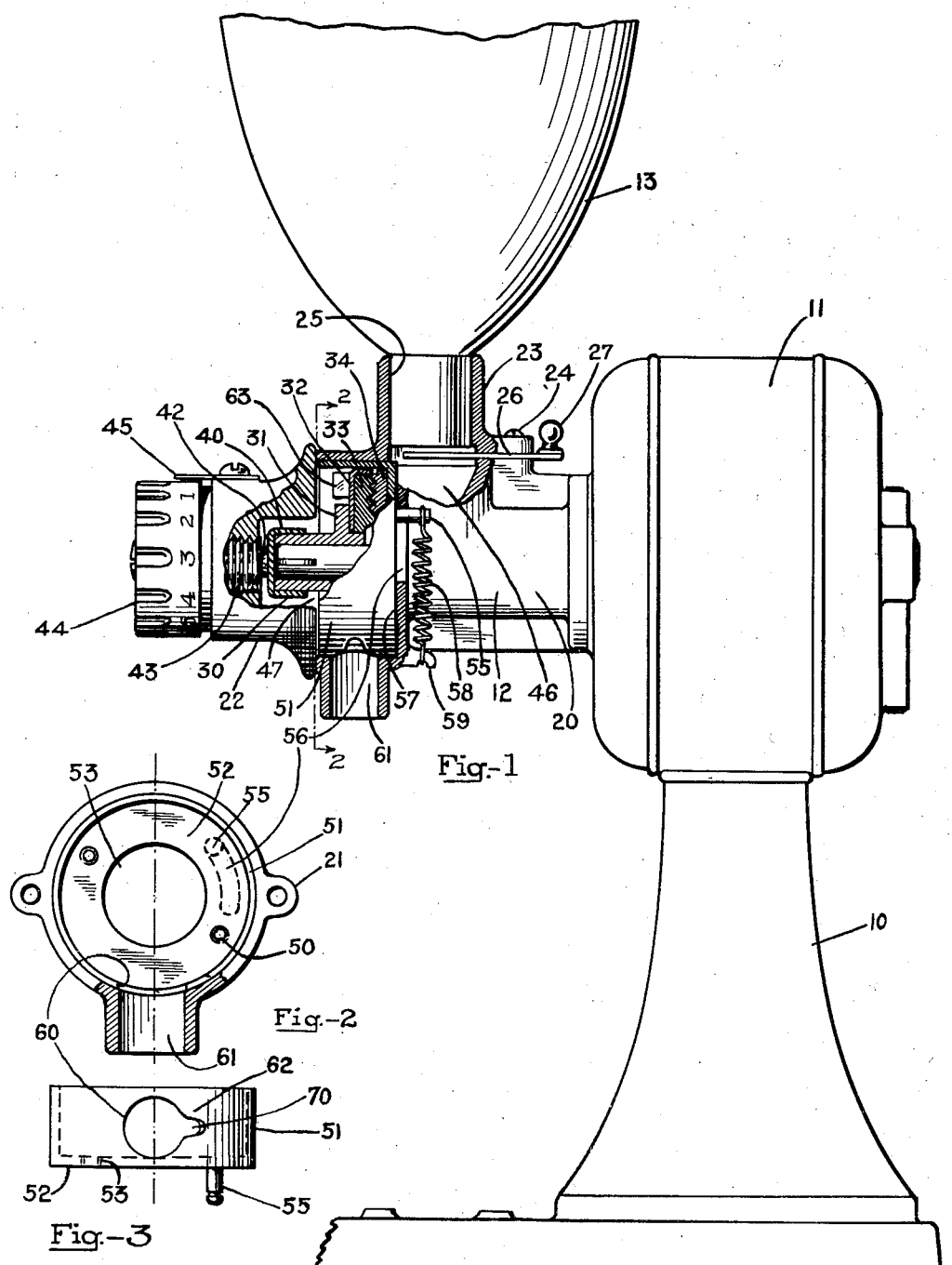

1,696,636

UNITED STATES PATENT OFFICE.

HERBERT L. JOHNSTON, OF TROY, OHIO, ASSIGNOR TO THE HOBART MANUFACTURING COMPANY, OF TROY, OHIO, A CORPORATION OF OHIO.

GRINDING APPARATUS.

Application filed August 1, 1927. Serial No. 209,915.

This invention relates to machines such as are used in grinding coffee or other material.

One object of the invention is to provide a grinding machine of this character having a discharge orifice with means for preventing injury to a finger of the operator through its insertion into the discharge orifice.

Another object is to provide a grinding machine of this character with means for automatically controlling the size of the discharge orifice to prevent injury to the fingers of the operator.

A further object of the invention is to provide a machine of this type with means actuated upon initial grinding action to open the discharge orifice.

Other objects and advantages of the invention will be apparent from the following description and from the drawing.

In the drawing:

Fig. 1 is a side elevation of the machine, a portion of which is shown in central section to disclose various parts of the present invention;

Fig. 2 is a section on the line 2—2 of Fig. 1, partly broken away and with the rotatable grinding member removed; and Fig. 3 is a bottom plan view of the closure member.

Referring more particularly to the drawing by reference numerals in which corresponding numerals designate like parts in the various views, the invention is shown as applied to grinding machines for grinding coffee or other material. A pedestal 10 provides a support for an electric motor 11 from which extends a grinding casing designated generally 12. A receiving hopper 13 is provided above the grinding casing by means of which the coffee or other material to be ground is supplied to the casing.

The grinding casing 12 as shown projects laterally from one end of the motor housing and embodies the main body member 20 to which is attached as by means of suitable attachment lugs 21 the end piece 22. A top piece 23 is fastened as by suitable attachment bolts 24 to the upper side of the main body member 20 and is provided with an inner bore 25 which receives the lower end of the hopper 13. The passage or bore provided in the top piece 23 may be opened or restricted as desired to govern the flow of material into the grinding casing by means of an adjustable slide 26 which may be manually set by the control knob 27 to regulate the size of the opening.

The motor shaft projects laterally some distance from the side of the motor housing as indicated at 30, extending through the main body member 20 in which it is suitably supported. The end portion of the shaft is suitably keyed to a flanged torque member 31 to which is rigidly bolted or attached the plate 32 and a disc-shaped grinding burr 33. The grinding burr 33 cooperates with a second grinding burr 34, both of the grinding burrs being provided with series of concentrically arranged grinding ridges or serrations.

The grinding member or burr 33 is rotated with the shaft 30 but the keyed connection with this shaft permits longitudinal movement of the rotatable assembly formed of the parts 31, 32 and 33, along the shaft. A flanged end-thrust disc 40 fits over the cylindrical end of the torque member 31 and rotates therewith in engagement with the reduced extension 42 projecting from the center of the end of a threaded screw 43 which is attached to an adjusting cylinder 44 so that as the latter is manually rotated the screw 43 is threaded lengthwise within the end piece 22 of the casing. The inner end of the screw 43 thus forms a stop which limits the outward movement of the rotatable burr assembly along the shaft and controls the distance between the two grinding burrs. As shown the adjusting cylinder 44 preferably is provided with indicia which cooperate with a fixed index member 45 to indicate to the operator the degree of fineness for which the machine is adjusted. As the coffee or other material to be ground is supplied to the grinding chamber it passes from the space 46 of this chamber, between the shaft 30 and the inner portions of the grinding burrs and is ground by relative rotational movement of the grinding burrs, the coffee then traveling from the peripheral portions of the grinding burrs into the space 47 provided at the side of the grinding burrs and adjacent the end piece 22 of the casing.

The grinding burr 34 is fastened by means of suitable attachment means such as the screws 50 to one end of a sleeve member 51, the end 52 being provided with a hole 53 somewhat larger than the diameter of the shaft 30 to permit the coffee to travel to the left through the opening 53 as viewed in Fig. 1. The sleeve member 51 is loosely supported within a corresponding cylindrical inner surface provided in the main body member 20 of the casing so that it may rotate a limited amount therein. A pin 55 projects from the end 52 of this cylindrical member, and is movable within a slot 56 of arcuate form which is provided in the wall 57 of the main body member 20 of the casing, the slot being concentrically arranged in relation to the axis of the shaft 20. The sleeve member 51 is normally maintained in a predetermined position with the pin 55 at the bottom of the slot by means of a tension spring 58 which is fastened at its upper end to the pin and at its lower end to a lug 59 provided at a suitable point adjacent the lower portion of the body member 20.

Adjacent its lower portion the sleeve member 51 is provided with an opening 60 which substantially corresponds in size and shape with the discharge orifice 61 provided by the lower portion of the casing. The sleeve 51 thus forms a closure member for the discharge orifice, the hole 60 being positioned in the cylindrical wall of the member 51 so that when the pin 55 is at the bottom of the slot the discharge orifice will be practically closed by the portion 62 of the sleeve adjacent the hole 60. The spring 58 therefore normally maintains the discharge orifice substantially closed, but when a driving torque is supplied by the rotatable burr assembly as when coffee is being ground between the burrs the cylindrical member 51 will be rotated against the tension of the spring 58 so that the pin 55 will move up in the slot 56 to the position shown in Fig. 1, when the hole 60 registers with the discharge orifice 61 of the casing. Thus upon initial grinding action of the grinding burrs the discharge orifice will be automatically opened by reason of the torque exerted by the grinding burrs and the ground coffee may pass through the discharge orifice of the casing and be collected. Suitable stirring vanes or arms 63 are provided on the plate 32 to direct the coffee towards the discharge opening in the casing, these vanes or arms being situated on the outer portions of the plate 32 so that they pass close to the discharge orifice and thus accelerate the flow of the ground coffee out of the space 47 and into the discharge orifice. When the coffee has all been ground and the rotational driving torque is no longer transmitted to the grinding burr 34 the spring 58 restores the member 51 to its original and normal position, thus substantially closing the discharge orifice. When thus closed it will be understood that the operator is prevented from inserting his finger into the operating parts of the machine through the discharge orifice and thus receiving possible injury, the discharge orifice being fully open only during the grinding operation.

Near the end of the grinding operation the amount of coffee between the grinding burrs diminishes and as it does so there is a corresponding tapering off of the torque transmitted to the burr 34 which causes the gradual closing of the discharge orifice. Finally there will be only a few grains of coffee between the burrs,—insufficient to provide torque enough to equal the pull of the spring 58, and the pin 55 will then engage the bottom of the slot. To permit the complete discharge of even these last few grains and of the few grains which may still be in the space 46 a small opening or recess 70 is provided, as indicated in Fig. 3 preferably as a continuation of the main hole 60 so that when the closure member is in effective closing position, with pin 55 at the lower end of its slot, the small opening or recess 70 will still be in registration with a side of the discharge orifice 61 and the last few grains of coffee from the space 46 may flow out through the small opening thus provided. The small opening 70 however is sufficiently small to prevent the finger of the operator from being inserted through it.

It will thus be apparent that in accordance with the present invention means have been provided for normally maintaining the discharge orifice of the casing closed against the insertion of the finger to prevent the liability of injury to the operator, but the closure member is actuated upon initial grinding action so that it may be automatically opened to provide for the unrestricted discharge of the ground material.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a machine of the class described, a casing, grinding means in said casing, a motor for operating said grinding means, said casing having a discharge orifice normally closed against the insertion of the operator's finger, and means actuated upon initial grinding action of said grinding means for opening said discharge orifice.

2. In a machine of the class described, a casing, grinding means in said casing, a motor for operating said grinding means, said casing having a discharge orifice normally closed against the insertion of a finger but through which the operator's finger might be inserted when the grinding means is in effective operation, and means brought into play by the grinding action for increasing the effective opening of said discharge orifice.

3. In a machine of the class described, a casing, grinding means in said casing, operating means for said grinding means, said casing having a discharge orifice, closure means for said discharge orifice and means for maintaining said closure means in open position during the grinding operation.

4. In a machine of the class described, a casing having a normally closed discharge orifice through which an operator's finger might be inserted when the grinding means is in effective operation, grinding means supported by said casing, means for operating said grinding means, and means automatically operable upon the starting of the grinding operation for opening said discharge orifice.

5. In a machine of the class described, a casing having an orifice normally closed against the insertion of a finger of the operator, a rotatable grinding burr in said casing, a motor for operating said grinding burr, and means actuated by the grinding burr for opening said orifice during effective grinding operation far enough to permit the insertion of an operator's finger through said orifice.

6. In a machine of the class described, a casing having an orifice normally closed against the insertion of a finger of the operator, rotatable grinding means mounted in said casing, a motor for driving said grinding means, and means actuated by the driving torque of the grinding operation to vary the size of said discharge orifice.

7. In a machine of the class described, a casing having a discharge orifice, a pair of relatively rotatable grinding means in said casing, means for driving one of said grinding means, a closure for said discharge orifice, and means connecting said closure to one of said grinding means to maintain said orifice open when said grinding means are in effective operation.

8. In a machine of the class described, a casing having a discharge orifice, a pair of grinding means supported in said casing, a motor connected to rotate one of said grinding means, a rotatable member connected to the other grinding means and having a portion adapted to normally close said discharge orifice, means for normally maintaining said portion in closing position, said member being mounted so as to be rotated by the grinding torque to maintain the discharge orifice open during effective grinding operation.

9. In a grinder of the class described, a casing having a discharge orifice, a pair of relatively rotatable grinding means mounted in said casing, a motor for operating one of said grinding means, a closure for partially closing said discharge orifice, means interconnecting said closure with said grinding means so that the closure is held in an ineffective position during effective grinding operation, and means normally maintaining said closure in effective closing position, said closure and orifice being arranged to provide a small opening when the closure is in effective closing position.

In testimony whereof I hereto affix my signature.

HERBERT L. JOHNSTON.